United States Patent
Yun (10) Patent No.: US 7,447,128 B2
(45) Date of Patent: Nov. 4, 2008

(54) METHOD FOR PERFORMING OPTIMAL RECORDING POWER CALIBRATION IN RECORDER AND RECORDING MEDIUM THEREFOR

(75) Inventor: Yeo Han Yun, Pyungtaek-si (KR)

(73) Assignee: LG Electronics, Inc., Seoul (KR)

( * ) Notice: Subject to any disclaimer, the term of this patent is extended or adjusted under 35 U.S.C. 154(b) by 743 days.

(21) Appl. No.: 10/980,274

(22) Filed: Nov. 4, 2004

(65) Prior Publication Data

US 2005/0128913 A1 Jun. 16, 2005

(30) Foreign Application Priority Data

Nov. 4, 2003 (KR) ............. 10-2003-0077770

(51) Int. Cl.
*G11B 7/004* (2006.01)
(52) U.S. Cl. ............. 369/47.5; 369/47.55; 369/53.26; 369/53.1; 369/53.11
(58) Field of Classification Search ............. 369/47.55, 369/53.26, 53.1, 53.11
See application file for complete search history.

(56) References Cited

U.S. PATENT DOCUMENTS

| 5,732,055 | A | * | 3/1998 | Masaki et al. ............ 369/53.26 |
| 5,818,807 | A | * | 10/1998 | Kuroda et al. ............. 369/116 |
| 6,898,162 | B2 | * | 5/2005 | Su et al. ............ 369/47.5 |
| 7,006,414 | B2 | * | 2/2006 | Ohba ............ 369/47.53 |
| 7,092,319 | B2 | * | 8/2006 | Sano ............ 369/13.27 |
| 2001/0007546 | A1 | * | 7/2001 | Lee et al. ............ 369/47.53 |
| 2001/0043536 | A1 | * | 11/2001 | Masaki et al. ............ 369/53.29 |
| 2002/0101808 | A1 | * | 8/2002 | Seo ............ 369/59.11 |
| 2002/0136123 | A1 | * | 9/2002 | Ogawa ............ 369/47.53 |
| 2002/0150013 | A1 | * | 10/2002 | Hsiao ............ 369/47.53 |
| 2003/0048713 | A1 | * | 3/2003 | Suzuki ............ 369/47.53 |
| 2003/0151994 | A1 | * | 8/2003 | Tasaka et al. ............ 369/47.53 |

FOREIGN PATENT DOCUMENTS

CN 1447312 A 10/2003

* cited by examiner

*Primary Examiner*—Wayne Young
*Assistant Examiner*—Thomas D Alunkal
(74) *Attorney, Agent, or Firm*—Birch, Stewart, Kolasch & Birch, LLP

(57) ABSTRACT

A method for performing optimal recording power calibration (OPC) on a recording medium, such as a DVD-RW, is characterized by flagging the address of the last test data. The method enables a recording position of the last test data to be quickly retrieved by recording position information of a power calibration area, in which the last test data is recorded, and indication information (such as a flag bit) indicating the recording position information is the last test data, in a specific area of the recording medium, such as the second field (field 1) of the format 1 RMD (recording management data). Such a method shortens the processing time prior to the OPC, and does not require the recorder to employ registers to determine the address of the last test data.

36 Claims, 7 Drawing Sheets

Format 1 RMD - Field 1

| BP | | Contents | Number of bytes |
|---|---|---|---|
| 0 to 31 | No 1 | Drive manufacturer ID (ex : A_drive) | 32 |
| --- | | --- | --- |
| 68 to 71 | | Recording power | 4 |
| 72 to 79 | | Time stamp | 8 |
| 80 to 83 | | Power calibration address | 4 |
| --- | | --- | --- |
| 128 to 159 | No 2 | Drive manufacturer ID (ex : B_drive) | 32 |
| --- | | --- | --- |
| 196 to 199 | | Recording power | 4 |
| 200 to 207 | | Time stamp | 8 |
| 208 to 211 | | Power calibration address | 4 |
| --- | | | |

FIG. 2
(Related Art)

Structure of Format 1 RMD, Format 2 RMD and Foramt 3 RMD

|  | Format 1 RMD | Format 2 RMD | Format 3 RMD |
|---|---|---|---|
| Field 0 | Common information | | |
| Field 1 | OPC related information | Pointer to RMD Set | OPC related information |
| Field 2 | User specification data | Erase operation information | User specification data |
| Field 3 -- Field 12 | Border Zone information | Set to (00) | Border Zone and RZone information |
| | RZone information | | Defect State Bitmap |
| Field 13 | Set to (00) | | |
| Field 14 | Set to (00) | | |

FIG. 3
(Related Art)

Format 1 RMD - Field 1

| BP | | Contents | Number of bytes |
|---|---|---|---|
| 0 to 31 | No 1 | Drive manufacturer ID (ex : A_drive) | 32 |
| - - - | | - - - | - - - |
| 68 to 71 | | Recording power | 4 |
| 72 to 79 | | Time stamp | 8 |
| 80 to 83 | | Power calibration address | 4 |
| - - - | | - - - | - - - |
| 128 to 159 | No 2 | Drive manufacturer ID (ex : B_drive) | 32 |
| - - - | | - - - | - - - |
| 196 to 199 | | Recording power | 4 |
| 200 to 207 | | Time stamp | 8 |
| 208 to 211 | | Power calibration address | 4 |
| - - - | | - - - | - - - |
| 256 to 287 | No 3 | Drive manufacturer ID (ex: C_drive) | 32 |
| - - - | | - - - | - - - |
| 324 to 327 | | Recording power | 4 |
| 328 to 335 | | Time stamp | 8 |
| 336 to 339 | | Power calibration address | 4 |
| - - - | | - - - | - - - |
| 384 to 415 | No 4 | Drive manufacturer ID (ex: D_drive) | 32 |
| - - - | | - - - | - - - |
| 452 to 455 | | Recording power | 4 |
| 456 to 463 | | Time stamp | 8 |
| 464 to 467 | | Power calibration address | 4 |
| - - - | | - - - | - - - |

Format 1 RMD - Field 1

| BP | | Contents | Number of bytes |
|---|---|---|---|
| 0 to 31 | No 1 | Drive manufacturer ID (ex : A_drive) | 32 |
| - - - | | - - - | - - - |
| 68 to 71 | | Recording power | 4 |
| 72 to 79 | | Time stamp | 8 |
| 80 to 83 | | Power calibration address | 4 |
| - - - | | - - - | - - - |
| 128 to 159 | No 2 | Drive manufacturer ID (ex : B_drive) | 32 |
| - - - | | - - - | - - - |
| 196 to 199 | | Recording power | 4 |
| 200 to 207 | | Time stamp | 8 |
| 208 to 211 | | Power calibration address | 4 |
| - - - | | | |

Flag bit = 1 : Last_PCA_Address
Flag bit = 0 : No_Last_PCA_Address

*Format 1 RMD - Field 1 - Field 1*

| | Contents |
|---|---|
| No 1 | Drive manufacturer ID (ex : A_drive) |
| | ... |
| | Recording power |
| | Time stamp |
| | Power calibration address (Flag bit=1) |
| No 2 | Drive manufacturer ID (ex : B_drive) |
| | ... |
| | Recording power |
| | Time stamp |
| | Power calibration address (Flag bit=0) |

*Format 1 RMD - Field 1 - Field 1*

| | Contents |
|---|---|
| No 1 | Drive manufacturer ID (ex : A_drive) |
| | ... |
| | Recording power |
| | Time stamp |
| | Power calibration address (Flag bit=0) |
| No 2 | Drive manufacturer ID (ex : B_drive) |
| | ... |
| | Recording power |
| | Time stamp |
| | Power calibration address (Flag bit=1) |

METHOD FOR PERFORMING OPTIMAL RECORDING POWER CALIBRATION IN RECORDER AND RECORDING MEDIUM THEREFOR

The present application claims, under 35 U.S.C. § 119, the priority benefit of Korean Patent Application No. P03-077770 filed Nov. 4, 2003, the entire contents of which are herein fully incorporated by reference.

BACKGROUND OF THE INVENTION

1. Field of the Invention

The present invention relates to a method for performing optimal recording power calibration (OPC) and a recording medium therefor, which can enable an OPC operation to be quickly performed in a recorder for recording data on a recording medium, such as a digital versatile disc-rewritable (DVD-RW).

2. Description of the Related Art

Recently, high-density recording mediums capable of permanently recording high-quality video and audio data, for example, digital versatile discs-rewritable (DVDs-RW), have been developed, commercialized and supplied. Furthermore, recorders such as DVD-recorders for recording and reproducing data on the DVDs-RW have been developed, commercialized and supplied.

Figure 1:
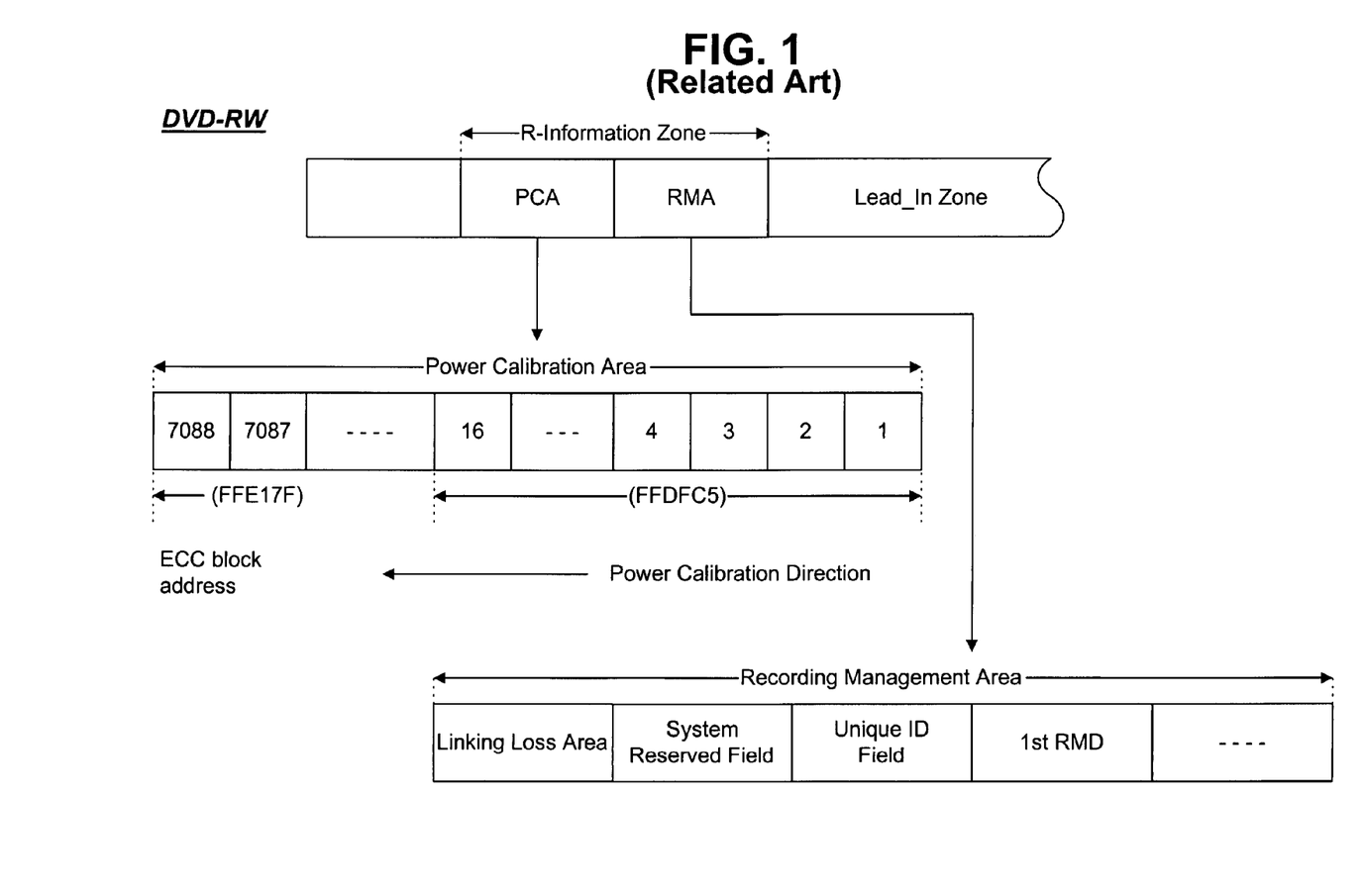
FIG. 1 is a schematic diagram illustrating a power calibration area (PCA) and a recording management area (RMA) assigned to a rewritable optical disc, in accordance with the related art.

As shown in FIG. 1, a power calibration area (PCA) necessary for performing an optimal recording power calibration (OPC) operation and a recording management area (RMA) are assigned to a DVD-RW. The PCA and the RMA are positioned before a lead-in zone.

For example, when a recorder such as a DVD-recorder receives a recording command based upon a user request, a set of OPC operations for recording data on a recording medium normally is automatically performed. The set of OPC operations includes a recording operation of predetermined test data in the PCA and an adjustment operation of a recording power value so that a beta ratio value indicating an asymmetry ratio of a radio frequency (RF) signal read and detected, according to the recorded test data, is close to zero. In this case, one error correction code (ECC) block having a size of 16 sectors within the PCA is used from an outer circumference direction to an inner circumference direction.

Figure 2:
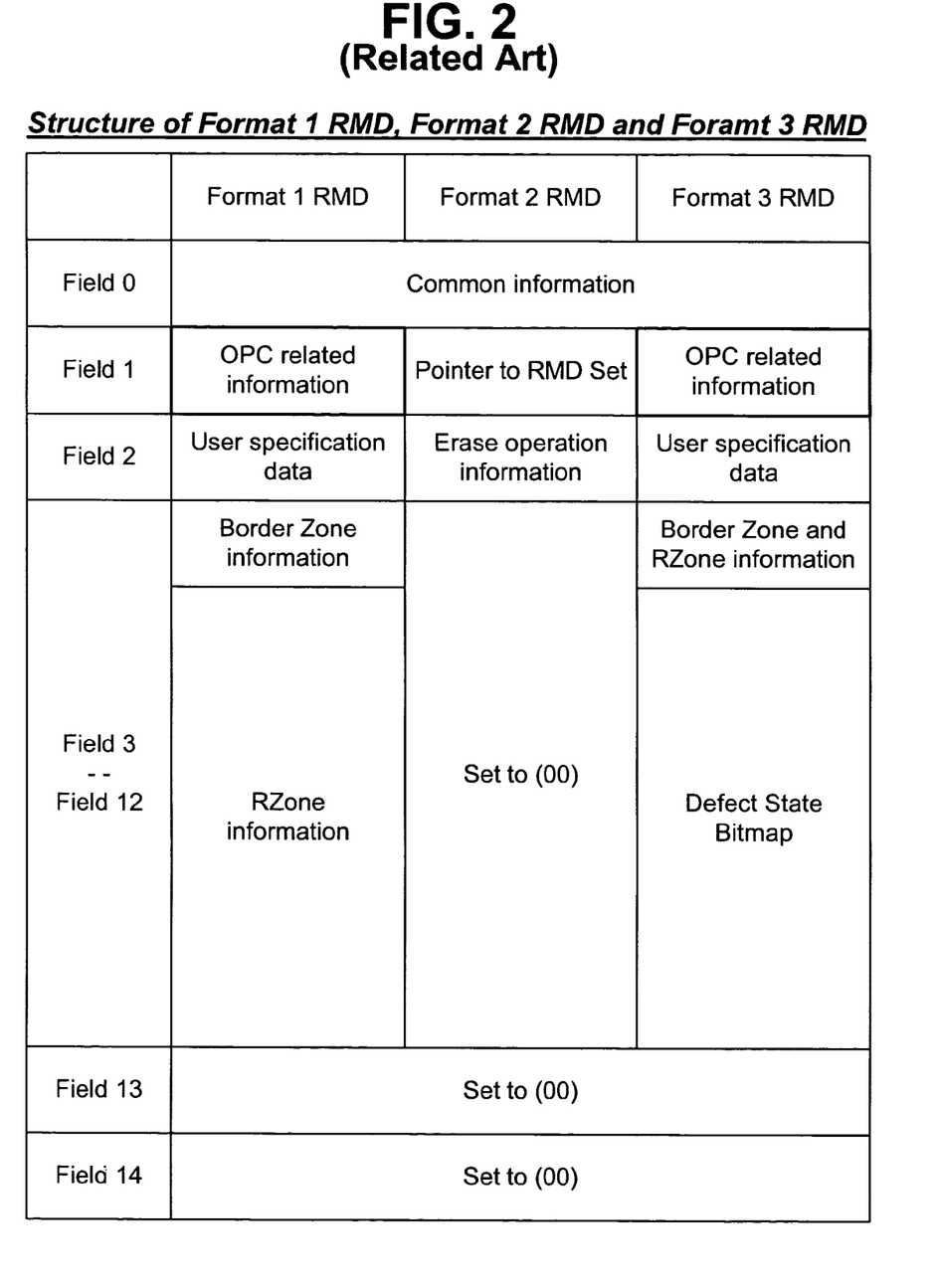
FIG. 2 is a table illustrating information recorded in fields: format 1 recording management data (RMD), format 2 RMD and format 3 RMD, in accordance with the related art.

Further, the RMA can contain, for example, 28 recording management data (RMD) blocks in which recording related data associated with an OPC operation is recorded. As shown in FIG. 2, format 1 RMD, format 2 RMD and format 3 RMD defined in the DVD-RW contain 15 fields (Field 0 ~Field 14) that have a record size of one sector.

Figure 3:
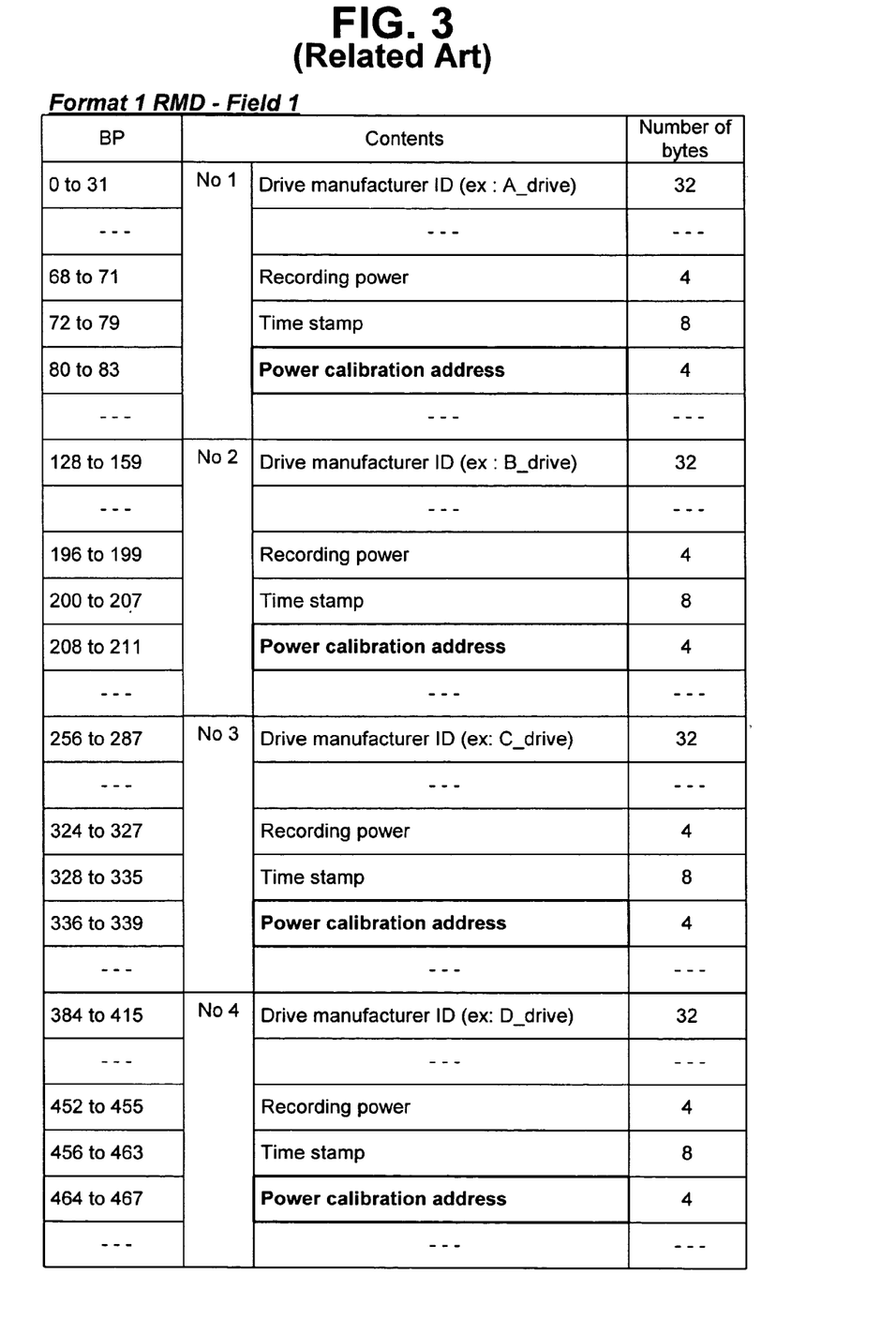
FIG. 3 is a table illustrating optimal power calibration (OPC) related information recorded in the second field (Field 1) for format 1 RMD, in accordance with the related art.

The second field (Field 1) for the format 1 RMD contains OPC related information. As shown in FIG. 3, the second field (Field 1) for the format 1 RMD contains four sections (Nos. 1, 2, 3 and 4) in which unique drive manufacturer identities (IDs) corresponding to a plurality of different recorders performing OPC operations are recorded.

And the four sections contain recording power information and time stamps along with the different drive manufacturer IDs (e.g., A_drive, B_drive, C_drive and D_drive). Furthermore, the four sections contain power calibration addresses having a predetermined record size, e.g., a record size of 4 bytes, as information indicating recording positions of the PCA in which test data is recorded according to OPC operations performed by the different recorders.

Where OPC operations are performed in the recorder, such as the conventional DVD-RW, power calibration addresses having a record size of 4 bytes are read from the four sections of the RMD block and the read power calibration addresses are temporarily stored in the recorder. The power calibration addresses are compared with one another, and a recording position of the PCA in which the last test data is recorded is retrieved. As described above, the test data is sequentially recorded in one ECC block having a size of 16 sectors from an outer circumference direction to an inner circumference direction. A power calibration address having the smallest value indicates recording position information associated with the last test data.

The power calibration addresses recorded in the four sections of the RMD block are read and compared so that a recording position of the last test data can be retrieved. In other words, it is necessary to find the address with the smallest value. This process is time consuming, and hence delays the beginning of the OPC operations. In order for the power calibration addresses having a record size of 4 bytes to be compared with one another, there is a problem in that the recorder must include a plurality of registers having a size of 4 bytes therein.

SUMMARY OF THE INVENTION

The present invention addresses one or more of the above problems. It is an object of the present invention to provide a method for performing optimal recording power calibration (OPC) in a recorder and a recording medium therefor, which can enable a recording position of the last test data to be quickly retrieved by recording recording position information of a power calibration area (PCA) in which the last test data is recorded and indication information indicating the recording position information of the last test data in a specific area of the recording medium, and referring to the indication information, in the recorder such as a digital versatile disc (DVD)-recorder.

In accordance with the present invention, the above and other objects can be accomplished by a method for performing optimal recording power calibration (OPC) in a recorder, comprising the steps of: (a) retrieving recording position information of last test data, referring to indication information; (b) recording test data necessary for performing an OPC operation from the retrieved recording position; (c) confirming a recording position of the test data on a recording medium; and (d) recording the confirmed recording position information and indication information indicating that the confirmed recording position is the recoding position of last test data.

In accordance with the present invention, the above and other objects can be accomplished by a recording medium, comprising: a first area provided to record test data necessary for performing an optimal recording power calibration (OPC) operation; a second area provided to record position information associated with the recorded test data on the recording medium; and a third area provided to record indication information, necessary for determining whether the position information recorded in the second area is recording position information of last test data.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFFERRED EMBODIMENTS

Hereinafter, preferred embodiments of a method for performing optimal recording power calibration (OPC) in a recorder and a recording medium therefore, in accordance with the present invention, will be described in detail with reference to the drawings.

Figure 4:
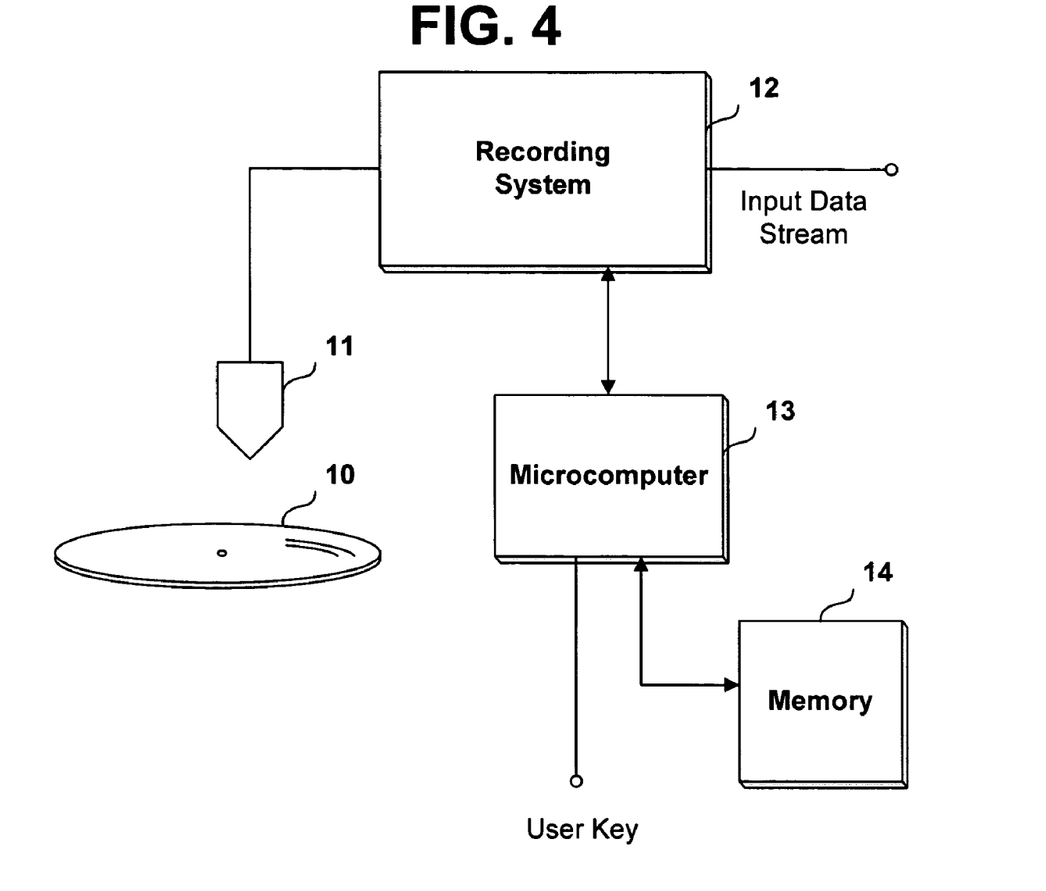
FIG. 4 is a block diagram illustrating a recorder to which an optimal recording power calibration (OPC) method is applied, in accordance with the present invention.

First, the OPC method, in accordance with the present invention can be applied to a recorder such as a digital versatile disc (DVD)-recorder. For example, the recorder includes an optical pickup 11, a recording system 12, a microcomputer 13, a memory 14, etc., as shown in FIG. 4.

The recording system 12 performs a set of OPC operations for appropriately recording an input data stream on a recording medium 10, such as a digital versatile disc-rewritable (DVD-RW), according to the operation control of the microcomputer 13. In accordance with an embodiment of the present invention, recording position information of a power calibration area (PCA), in which the last test data is recorded, and indication information indicating the recording position information of the last test data are recorded in a specific area of the DVD-RW.

Figure 5:
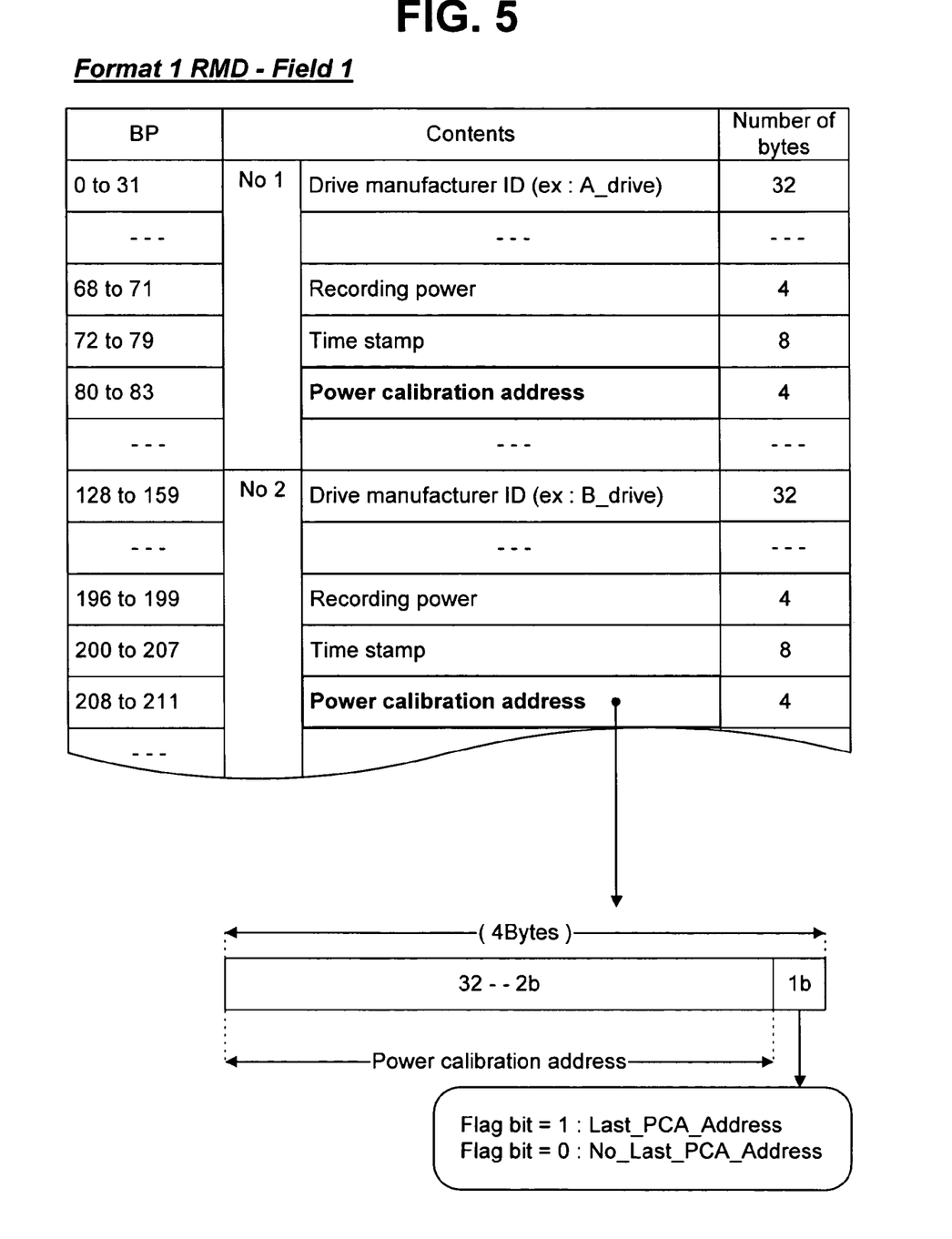
FIG. 5 is a table illustrating power calibration addresses and flag bits recorded in the second field (Field 1) for format 1 recording management data (RMD), in accordance with the present invention.

For example, the recording position information can be recorded as power calibration addresses in the first to fourth sections (Nos. 1, 2, 3 and 4) in which different drive manufacturer identities (IDs) are recorded in the second field (Field 1) for the format 1 RMD as shown in FIG. 5.

The indication information of at least one flag bit can be recorded within the power calibration address. For example, the $1^{st}$ bit 1$b$, contained in the 4-byte power calibration address, can be assigned as a flag bit (Flag_bit), and the remaining $2^{nd}$ to $32^{nd}$ bits 2$b$ to 32$b$, contained in the 4-byte power calibration address, can be assigned as recording position information of the PCA in which the last test data is recorded.

Furthermore, the indication information can be recorded in a reserved area of a corresponding section, irrespective of the power calibration address. For example, where the flag bit, is set to "1", a power calibration address containing the flag bit or contained within the same section, indicates recording position information of the PCA in which the last test data is recorded.

On the other hand, where the flag bit is set "0", a power calibration address containing the flag bit or contained within the same section does not indicate recording position information of the PCA in which the last test data is recorded.

Upon performing an OPC operation through an interface with the microcomputer 13, the recording system 12 sequentially retrieves and refers to indication information items recorded in the four sections of the RMD block. A power calibration address within an arbitrary section in which the flag is set to "1" is discriminated as recording position information of the PCA in which the last test data is recorded. A recording position of the PCA corresponding to the discriminated address is quickly retrieved and an OPC operation is performed. This will be described below in detail.

Figure 6:
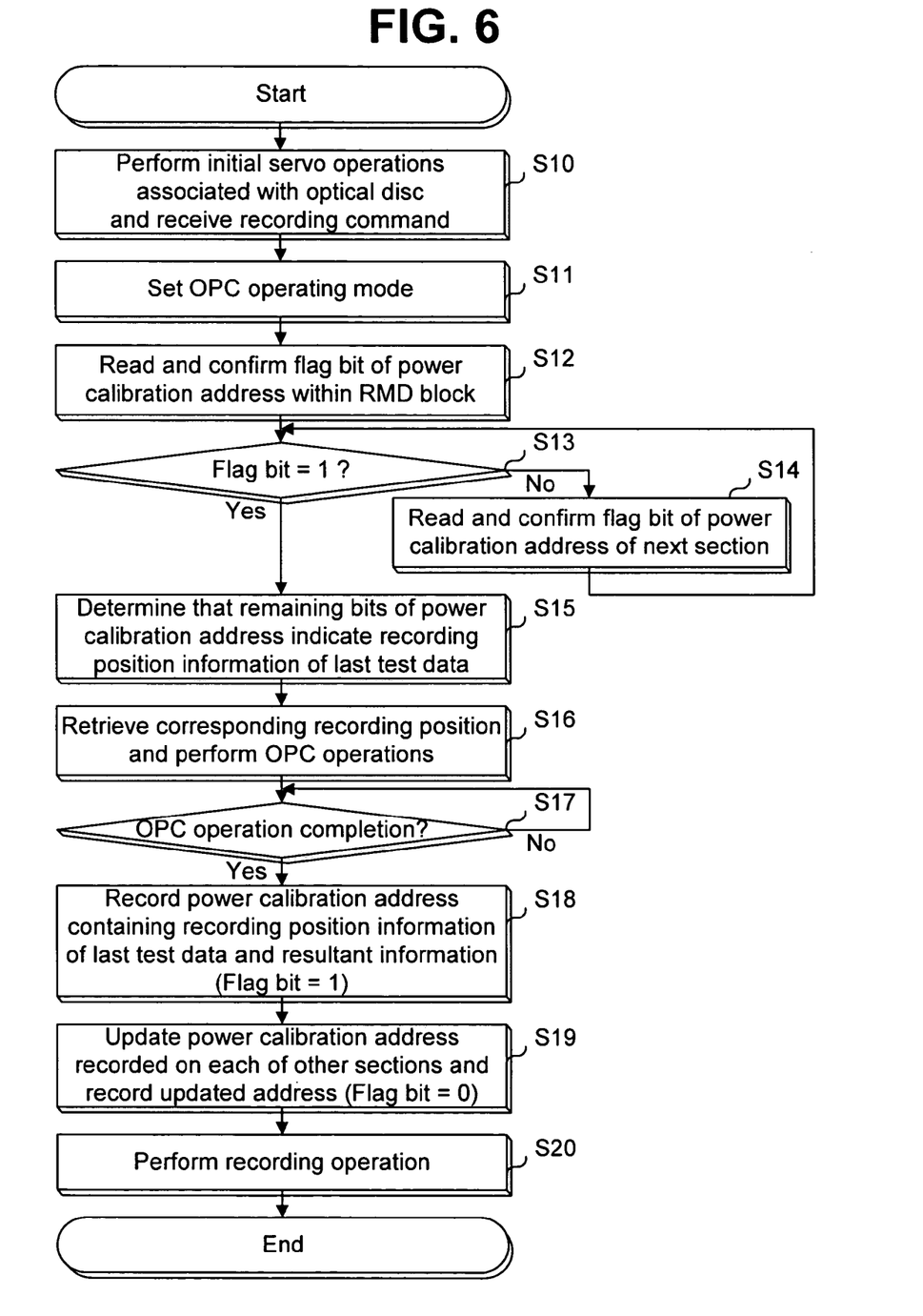
FIG. 6 is a flow chart illustrating the OPC method in the recorder, in accordance with the present invention.

FIG. 6 is a flow chart illustrating the OPC method in the recorder, in accordance with the present invention. Where the DVD-RW 10 is inserted into the recorder, such as the DVD-recorder as an example, the microcomputer 13 performs a set of initial servo operations, such as conventional focus and tracking servo operations. When a recording command is received according to a user request (S10), the microcomputer 13 controls an operation of the recording system 12.

The recording system 12 sets an OPC operating mode for performing a set of OPC operations (S11). The flag bit (Flag_bit) is read and confirmed from a specific area of the DVD-RW 10, for example, the $1^{st}$ bit (1$b$) of a power calibration address having a record size of 4 bytes recorded in each of the sections (Nos. 1, 2, 3 and 4) contained in the second field (Field 1) for the format 1 RMD, as described with reference to FIG. 5 (S12).

Figure 7:
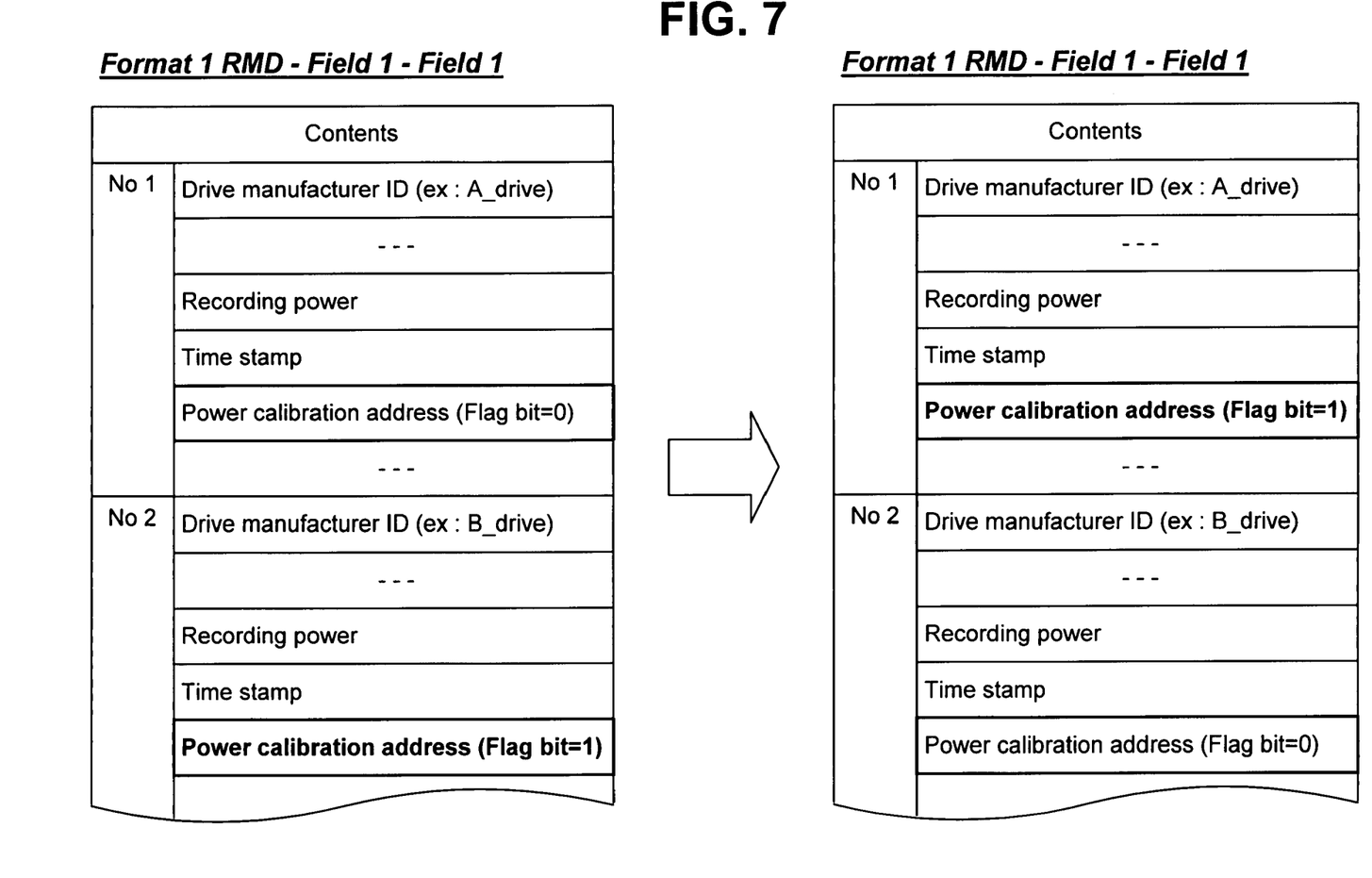
FIG. 7 is an explanatory view illustrating an operation in which a power calibration address and a flag bit are updated, in accordance with the present invention.

For example, where the flag bit (Flag_bit) is set to "0" as the $1^{st}$ bit (1$b$) of a power calibration address having a record size of 4 bytes recorded in the first section, as shown in FIG. 7 (S13), the recording system 12 determines that the remaining $2^{nd}$ to $32^{nd}$ bits (2$b$ to 32$b$) of the power calibration address do not indicate recording position information of the PCA in which the last test data is recorded. Then, the flag bit (Flag_bit) as the $1^{st}$ bit (1$b$) of a power calibration address having a record size of 4 bytes recorded in the second section is read and confirmed (S14).

Where the flag bit (Flag_bit) is set to "1" as the $1^{st}$ bit (1$b$) of the 4-byte power calibration address recorded in the second section, the recording system 12 determines that the remaining $2^{nd}$ to $32^{nd}$ bits (2$b$ to 32$b$) of the power calibration address indicate recording position information of the PCA in which the last test data is recorded (S15).

A recording position of the PCA corresponding to the $2^{nd}$ to $32^{nd}$ bits (2$b$ to 32$b$) of the power calibration address as the recording position information is retrieved, and a set of OPC operations is performed to record predetermined test data in the recording position (S16).

If the set of OPC operations has been completed (S17), the recording system 12 records a recording power value, a time stamp and a power calibration address containing the recording position information of the last test data in an arbitrary section in which a drive manufacturer ID corresponding to a corresponding recorder is recorded, for example, in the first section shown in FIG. 7. At this point, the recording system 12 records the flag bit indicating "1" in the $1^{st}$ bit of the 4-byte power calibration address recorded in the first section, and records the recording position information of the last test data in the remaining $2^{nd}$ to $32^{nd}$ bits (2$b$ to 32$b$) (S18).

As shown in FIG. 7, the recording system 12 updates the 1st bit of the 4-byte power calibration address recorded in the second section to "0" and records the updated bit (S19). After only one bit of four flag bits recorded in the first to fourth sections is set to "1", a recording operation is performed (S20).

As the flag bits are referred to and the recording position of the PCA in which the last test data is recorded is retrieved, a plurality of registers do not need to be included in the recorder, so that power calibration addresses recorded in the four sections are read, stored and compared, and hence the configuration of the recorder can be simplified.

As apparent from the above description, the present invention provides a method for performing optimal recording power calibration (OPC) in a recorder, which can efficiently reduce a time period required for retrieving a recording position of the last test data recorded in a power calibration area (PCA). Hence, the present invention can more quickly perform a substantial OPC operation. The present invention does not require a plurality of registers for comparing and confirming recording position information of the last test data in the recorder. Hence, the present invention simplifies the configuration of the recorder.

Although the preferred embodiments of the present invention have been disclosed for illustrative purposes, those skilled in the art will appreciate that various modifications, additions and substitutions are possible, without departing from the scope of the invention.

What is claimed is:

1. A method for performing an optimal recording power calibration (OPC) operation prior to recording data on an optical disc, the method comprising:
    accessing data previously stored in a management area of the optical disc;
    searching a set/unset status of a plurality of indicators;
    retrieving first position information from the management area corresponding to a set indicator;
    performing a new OPC operation in a previously unrecorded area of the optical disc, wherein the previously unrecorded area's position is based upon the retrieved first position information;
    recording second position information indicating the area where the new OPC operation was performed in the management area; and
    setting an indicator to indicate that the recorded second position information is associated with the latest OPC operation,
    wherein the first position information corresponds to an area on the optical disc which was last tested in a previous OPC operation,
    wherein said step of setting an indicator includes setting a flag bit in the management area, and
    wherein the flag bit is provided adjacent to the recorded second position information.

2. The method of claim 1, further comprising:
    changing the set status of the indicator to unset, after retrieving the first position information from the management area.

3. The method of claim 1, wherein the first position information is an address.

4. The method of claim 1, wherein said management area also includes information regarding at least one of a drive ID, a recording power, and a time stamp.

5. The method of claim 1, wherein the flag bit and the recorded second position information collectively occupy a 4 byte area in the management area.

6. The method of claim 5, wherein the flag bit is provided within the first byte of the 4 byte area.

7. A method for performing an optimal recording power calibration (OPC) operation prior to recording data on an optical disc, the method comprising:
    accessing data previously stored in a management area of the optical disc;
    retrieving first position information from the management area corresponding to an area on the optical disc which was last tested in a previous OPC operation;
    performing a new OPC operation in a previously unrecorded area of the optical disc, wherein the previously unrecorded area's position is based upon the retrieved first position information;
    recording second position information in the management area, the second position information representing the area where the new OPC operation was performed; and
    setting an indicator to indicate that the recorded second position information is associated with the latest OPC operation,
    wherein said step of setting an indicator includes setting a flag bit in the management area, and
    wherein the flag bit is provided adjacent to the recorded second position information.

8. The method of claim 7, further comprising:
    changing a status of an indicator associated with the first position information to indicate that the first position information is no longer associated with the latest OPC operation.

9. The method of claim 8, wherein the first and second position information are addresses.

10. The method of claim 7, wherein said management area also includes information regarding at least one of a drive ID, a recording power, and a time stamp.

11. The method of claim 7, wherein the flag bit and the recorded second position information collectively occupy a 4 byte area in the management area, and
    wherein the flag bit is provided within the first byte of the 4 byte area.

12. The An optical recording medium, comprising:
    a first area provided to record test data necessary for performing an optimal recording power calibration (OPC) operation;
    a second area provided to record position information associated with previously recorded test data in said first area; and
    a third area provided to record indication information necessary for determining whether the position information recorded in said second area is associated with the latest OPC operation,
    wherein said indication information is a flag bit.

13. The optical recording medium of claim 12, wherein said second area and said third area are provided adjacently to each other.

14. The optical recording medium of claim 12, wherein said first area, said second area and said third area are provided before a lead-in zone of said optical recording medium.

15. The optical recording medium of claim 12, wherein said flag bit is provided adjacent to said recorded position information in said second area.

16. The optical recording medium of claim 15, wherein said flag bit and said recorded position information collectively occupy a 4 byte area in a management area.

17. The optical recording medium of claim 16, wherein said flag bit is provided within the first byte of the 4 byte area.

18. The optical recording medium of claim 12, wherein said position information is an address.

19. The optical recording medium of claim 12, wherein said second area and said third area are contained within a second field ("field 1") of a format 1 recording management data ("format 1 RMD") area of said optical disc.

20. The optical recording medium of claim 12, wherein said second area and said third area are provided in a management area of said optical recording medium.

21. The optical recording medium of claim 20, wherein said management area also includes information regarding at least one of a drive ID, a recording power, and a time stamp.

22. A method of creating optimal recording power calibration (OPC) information in an optical recording medium, the method comprising:

recording test data used for performing an optimal recording power calibration (OPC) operation in an OPC test area on the recording medium;

recording indication information indicating the test data recording has been recorded in the OPC test area; and recording position information associated with the recorded test data, wherein the indication information is recorded in a first field and the position information is recorded in a second field in which the first field is provided adjacent to the second field.

23. The method of claim 22, wherein the recording the indication information step records the indication information each time the OPC operation is performed.

24. The method of claim 22, wherein the position information is an address used to indicate a position of an unrecorded data block that can be used to perform the OPC operation.

25. The method of claim 24, wherein the address indicates an address of a last recorded data block that was used to perform the OPC operation.

26. The method of claim 22, wherein the identification information indicates that the test data recorded in the OPC test area is a last test data recorded corresponding to a last performed OPC operation.

27. An optical recording medium, comprising:

an optimal recording power calibration (OPC) test area provided to record test data used for performing an OPC operation;

a first field provided to record indication information indicating the test data recording has been recorded in the OPC test area; and a second field provided to record position information associated with the recorded test data, wherein the first field is provided adjacent to the second field.

28. The optical recording medium of claim 27, wherein the indication information is recorded each time the OPC operation is performed.

29. The optical recording medium of claim 27, wherein the position information is an address used to indicate a position of an unrecorded data block that can be used to perform the OPC operation.

30. The optical recording medium of claim 29, wherein the address indicates an address of a last recorded data block that was used to perform the OPC operation.

31. The optical recording medium of claim 27, wherein the identification information indicates that the test data recorded in the OPC test area is a last test data recorded corresponding to a last performed OPC operation.

32. A recording apparatus, comprising:

a recording unit configured to record test data used for performing an optimal recording power calibration (OPC) operation in an OPC test area on a recording medium, to record indication information indicating the test data recording has been recorded in the OPC test area, and to record position information associated with the recorded test data, wherein the indication information is recorded in a first field and the position information is recorded in a second field in which the first field is provided adjacent to the second field.

33. The recording apparatus of claim 32, wherein the recording unit is further configured to record the indication information each time the OPC operation is performed.

34. The recording apparatus of claim 32, wherein the position information is an address used to indicate a position of an unrecorded data block that can be used to perform the OPC operation.

35. The recording apparatus of claim 34, wherein the address indicates an address of a last recorded data block that was used to perform the OPC operation.

36. The recording apparatus of claim 32, wherein the identification information indicates that the test data recorded in the OPC test area is a last test data recorded corresponding to a last performed OPC operation.

* * * * *